Patented Dec. 5, 1950

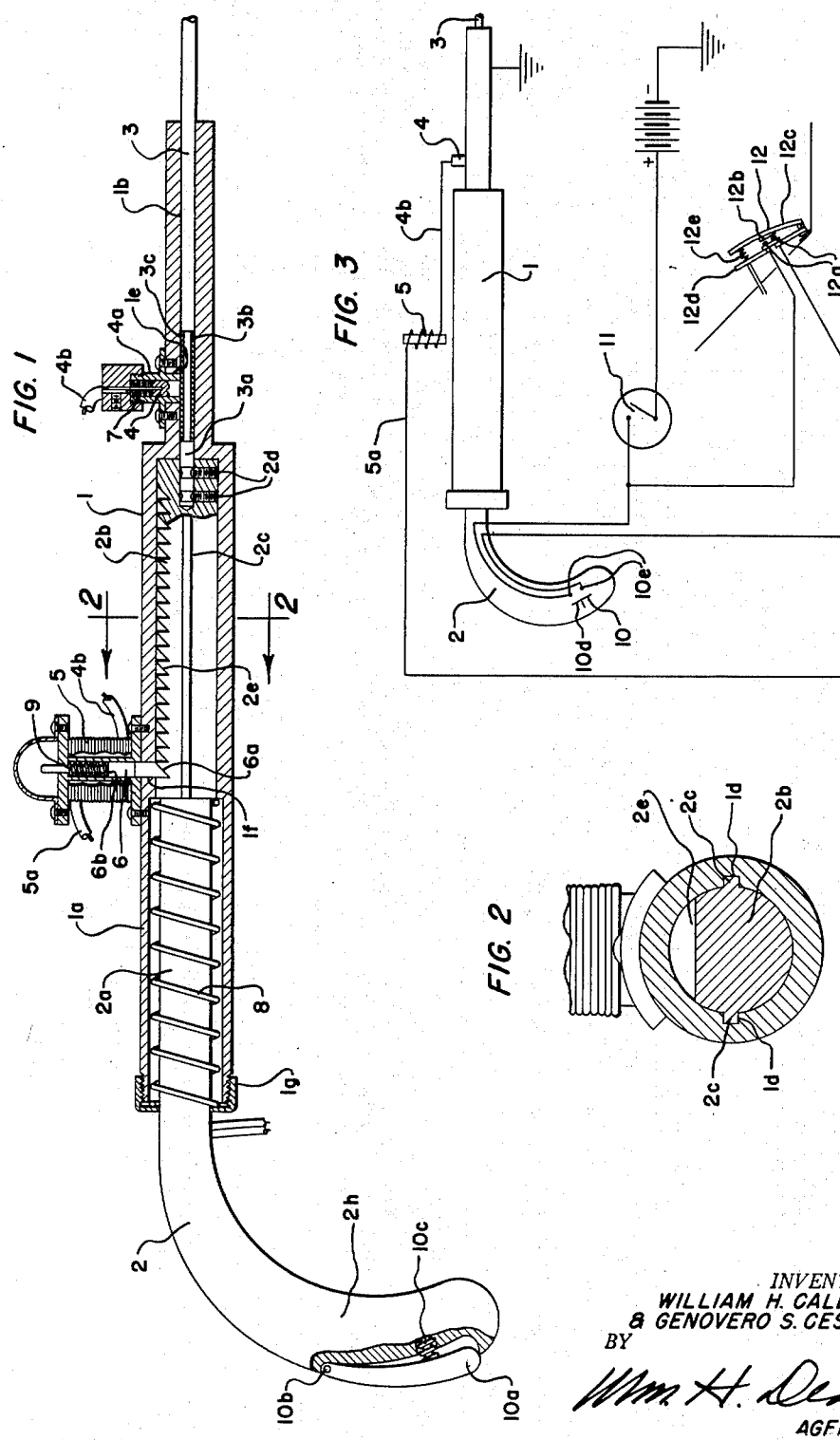

2,532,357

UNITED STATES PATENT OFFICE 2,532,357

AUTOMATIC BRAKE RELEASING APPARATUS

William H. Callender and Genovero S. Cesena, San Diego, Calif.

Application August 8, 1949, Serial No. 109,219

4 Claims. (Cl. 192—3)

Our invention relates to an automatic brake releasing apparatus, more particularly for use in connection with the emergency brake of motor vehicles, and the objects of our invention are:

First, to provide an automatic brake releasing apparatus of this class which releases the emergency brake of a motor vehicle preliminary to the movement of the vehicle after the hand brake has been set;

Second, to provide a brake releasing apparatus of this class which prevents burning of the conventional emergency brake lining, due to inadvertent movement of the motor vehicle with the emergency brake set;

Third, to provide an automatic brake releasing apparatus of this class having a throttle pedal switch in series with the engine ignition switch of a motor vehicle, which automatically energizes a solenoid for releasing the hand brake of the vehicle when the throttle pedal is pressed subsequent to the closing of the ignition switch;

Fourth, to provide an automatic brake releasing apparatus of this class in which the solenoid releasing means is de-energized when the hand brake is released, so that the circuit to the solenoid cannot be closed until the hand brake is again set;

Fifth, to provide an automatic brake releasing device of this class which requires no conscious effort on the part of the automobile operator in the releasing of the hand brake of the vehicle; and Sixth, to provide an automatic brake releasing apparatus of this class which is very simple and economical of construction, efficient in operation, and which will not readily deteriorate or get out of order.

With these and other objects in view, as will appear hereinafter, our invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a longitudinal sectional view of our automatic brake releasing apparatus, showing parts and portions thereof in elevation to facilitate the illustration, and showing portions broken away to amplify the illustration; Fig. 2 is an enlarged fragmentary cross-sectional view, taken from the line 2—2 of Fig. 1; and Fig. 3 is a diagrammatic view of the electrical wiring of our automatic brake releasing apparatus.

Similar characters of reference refer to similar parts and portions throughout the several views of the drawings.

The casing 1, handle 2, cable 3, brush contact 4, solenoid 5, latch plunger 6, springs 7, 8 and 9, and the switches 10, 11 and 12, constitute the principal parts and portions of our automatic brake releasing apparatus.

The casing 1 is a hollow cylindrical member which is fixed stationarily to the structure of the motor vehicle chassis, and is provided with an enlarged bore portion 1a and a reduced bore portion 1b, which are concentric with each other. Reciprocally mounted in the enlarged bore 1a is the plunger portion 2a of the handle 2, integral with which is the ratchet portion 2b, which is provided with key portions 2c on opposite sides thereof, slidably engaged in slots 1d in the inner side wall of the casing 1, as shown best in Fig. 2 of the drawings. Fixed to the ratchet portion 2b of the handle 2 by means of the set screws 2d is the insulation section 3a of the cable 3, all as shown in Fig. 1 of the drawings.

Near the end 3a of the cable 3, said cable 3 is provided with an annular elongated groove 3b, in which the electrical insulation sleeve 3c is fitted, all as shown best in Fig. 1 of the drawings. The cable 3 extends to the conventional emergency brake band mechanism, which is no part of my present invention and which is not shown in the drawings. Communicating with the bore 1b of the casing 1, as shown in Fig. 1 of the drawings, is a transverse opening 1e, through which the casing 4a of the brush contact 4 extends. This brush contact 4 in the casing 4a is provided with a spring 7, adapted to force the brush contact 4 into engagement with the cable 3 or the insulation shield 3c, whichever is adjacent thereto. Electrically connected with the brush contact 4 is a conductor 4b, which extends to the solenoid 5 and is arranged in electrical connection therewith.

The solenoid 5 is provided with a latch plunger 6, having a beveled buttress end portion 6a, engageable with the beveled buttress ratchet teeth 2e of the ratchet portion 2b of the handle 2. This ratchet plunger 6a extends through an opening 1f in the side wall of the casing 1. The opposite end of the solenoid winding from the conductor 4b is provided with a conductor 5a, as shown best in Figs. 1 and 3 of the drawings. Surrounding the plunger portion 2a of the handle 2 is a spring 8, which engages the ratchet portion 2b of the handle 2 at its one end and the casing cap 1g at its opposite end, tending to force the handle 2 inwardly of the casing 1.

The spring 9 engages the latch plunger 6 at its shoulder portion 6b, tending to force the same downwardly into engagement with the ratchet teeth 2e of the ratchet portion 2b of the handle 2. The switch 10 is positioned in the extremity of the handle 2, and this switch 10 is provided with a lever 10a pivoted on a pin 10b in the downwardly curved portion 2h of the handle 2. This lever 10a is provided with a spring 10c, tending to hold the contact bridge 10d of the switch 10 away from the contacts 10e thereof, as shown in Fig. 3 of the drawings. Thus, the switch 10 is a normally open switch. The switch 11 is a conventional automobile engine ignition switch, while the switch 12 is operated by pressure of a person's foot on the conventional engine throttle. This switch 12 is provided with a pair of contacts 12a on the conventional throttle pedal, engageable by a bridge 12b connected to the auxiliary pedal 12c, which is pivoted in spaced relation to the conventional throttle pedal 12d, all as shown best in Fig. 3 of the drawings. The spring 12e tends to maintain the pedal 12c in spaced relationship with the pedal 12d, holding the bridge 12b in spaced relationship with the contacts 12a, maintaining a normal open condition of the switch 12.

The operation of our automatic brake releasing apparatus is substantially as follows: The handle 2, is in released position, as shown in Fig. 1 of the drawing, and when the emergency brake is set the handle 2 is extended from the casing 1, whereupon the brush contact 4 is engaged by conduction portion of the cable 3 beyond the insulation sleeve 3c, supplying a ground connection to the solenoid 5, and the spring 9 maintains the latch plunger 6 in engagement with the ratchet teeth 2e, preventing inadvertent retraction of the plunger portion 2a of the handle 2 by means of the spring 8.

When the automobile engine is started and the ignition switch 11 remains closed, either of the switches 10 or 12 in series with the switch 11 may be used to operate the solenoid 5 for retracting the plunger 6 and permitting the spring 8 to force the handle 2 inwardly for releasing the emergency brake. In the event the operator forgets to close the switch 10, the brake is automatically released by pressure of the foot on the throttle pedal 12c, which causes the bridge 12b to close the contacts 12a against compression of the spring 12e. When the switch 12 has been closed, the solenoid 5, is energized, causing retraction of the plunger 6, permitting the spring 8 to retract the plunger portion 2a of the handle 2, and extend the cable 3, whereupon the brake is released and the insulation sleeve 3c shuts off the ground connection or ground current supply to the solenoid 5, whereupon continued pressure of the throttle pedal 12c against the throttle pedal 12d does not affect the solenoid 5 or energize the same. The solenoid 5 is therefore inert until such time as the emergency brake is again set and either the switch 10 or the switch 12 is closed for releasing the emergency brake. It will be noted that the buttress ratchet teeth 2e and the end 6a of the ratchet plunger 6 permit the handle 2 to be readily extended from the casing 1 manually against compression of the spring 9, which maintains the ratchet plunger 6 in engagement with the teeth 2e at all times, except during energization of the solenoid 5.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a brake releasing apparatus, an emergency brake plunger handle having an electrical conducting portion grounded to a vehicle chassis, a solenoid stationarily mounted relative to said plunger handle and having a movable member axially angular to the axis of said plunger handle, and engageable therewith for maintaining said plunger handle in certain position longitudinally of its axis, and electrical switch means for energizing said solenoid and retracting said movable member, a spring for retracting said plunger handle and releasing the emergency brake connected therewith, insulation contact means in connection with said plunger handle, a brush contact stationarily mounted relative to said plunger handle, engageable by said insulation contact means when said plunger handle is in released position, said brush contact means electrically connected with said solenoid for supplying ground current connection therefor when said brush contacts said electrical conducting portion grounded to said vehicle chassis.

2. In a brake releasing apparatus for use in a motor vehicle having a throttle pedal, an emergency brake plunger handle having an electrical conducting portion grounded to a vehicle chassis, a solenoid stationarily mounted relative to said plunger handle and having a movable member axially angular to the axis of said plunger handle, and engageable therewith for maintaining said plunger handle in certain position longitudinally of its axis, and electrical switch means for energizing said solenoid and retracting said movable member, a spring for retracting said plunger handle and releasing the emergency brake connected therewith, insulation contact means in connection with said plunger handle, a brush contact stationarily mounted relative to said plunger handle, engageable by said insulation contact means when said plunger handle is in released position, said brush contact means electrically connected with said solenoid for supplying ground current connection therefor when said brush contacts said electrical conducting portion grounded to said vehicle chassis, and switch means in circuit with said brush contact for controlling said solenoid, said switch means being on the engine throttle pedal of the motor vehicle to which said plunger handle is connected, whereby operation of the throttle automatically closes said switch and energizes said solenoid which releases said plunger handle and the emergency brake connected therewith.

3. In a brake releasing apparatus for use in a motor vehicle having a throttle pedal and conventional ignition switch, an emergency brake plunger handle having an electrical conducting portion grounded to a vehicle chassis, a solenoid stationarily mounted relative to said plunger handle and having a movable member axially angular to the axis of said plunger handle, and engageable therewith for maintaining said plunger handle in certain position longitudinally of its axis, and electrical switch means for energizing said solenoid and retracting said movable member, a spring for retracting said plunger handle and releasing the emergency brake connected therewith, insulation contact means in connection with said plunger handle, a brush contact stationarily mounted relative to said plunger handle, engageable by said insulation contact means when said plunger handle is in released position, said brush contact means electrically connected with said solenoid for supplying ground current connection therefor when said brush contacts said electrical conducting portion grounded to said vehicle chassis, and switch means in circuit with said brush contact for controlling said solenoid, said switch means being on the engine throttle pedal of the motor vehicle to which said plunger handle is connected, whereby operation of the throttle automatically closes said switch and energizes said solenoid which releases said plunger handle and the emergency brake connected therewith, said switch in series with the ignition switch of the motor vehicle.

4. In a brake releasing apparatus for use in a motor vehicle having a throttle pedal and conventional ignition switch, an emergency brake plunger handle having an electrical conducting portion grounded to a vehicle chassis, a solenoid stationarily mounted relative to said plunger handle and having a movable member axially angular to the axis of said plunger handle, and engageable therewith for maintaining said plunger handle in certain position longitudinally of its axis, and electrical switch means for energizing said solenoid and retracting said movable member, a spring for retracting said plunger handle and releasing the emergency brake connected therewith, insulation contact means in connection with said plunger handle, a brush contact stationarily mounted relative to said plunger handle, engageable by said insulation contact means when said plunger handle is in released position, said brush contact means electrically connected with said solenoid for supplying ground current connection therefor when said brush contacts said electrical conducting portion grounded to said vehicle chassis, and switch means in circuit with said brush contact for controlling said solenoid, said switch means being on the engine throttle pedal of the motor vehicle to which said plunger handle is connected, whereby operation of the throttle automatically closes said switch and energizes said solenoid which releases said plunger handle and the emergency brake connected therewith, said switch in series with the ignition switch of the motor vehicle, a second switch in connection with said plunger handle in series with the conventional ignition switch of the motor vehicle engine, and connected with said solenoid.

WILLIAM H. CALLENDER.
GENOVERO S. CESENA.

REFERENCES CITED

The following references are of record in the file of this patent:

UNITED STATES PATENTS

| Number | Name | Date |
|---|---|---|
| 1,972,300 | Hemingway | Sept. 24, 1934 |
| 2,010,628 | Duecy | Aug. 6, 1935 |
| 2,140,780 | Wimmer | Dec. 30, 1938 |
| 2,411,632 | Moran | Nov. 26, 1946 |